United States Patent [19]
Fearno

[11] 3,897,595
[45] July 29, 1975

[54] DYNAMIC MOTOR BRAKE CONTROL FOR AC MOTORS

[75] Inventor: John O. Fearno, Cologne, Minn.

[73] Assignee: Helland Research and Engineering Inc., Minnetonka, Minn.

[22] Filed: Jan. 28, 1974

[21] Appl. No.: 437,400

[52] U.S. Cl. .............................................. 318/212
[51] Int. Cl. ............................................ H02p 3/20
[58] Field of Search ........................... 318/209–212, 318/375, 376

[56] References Cited
UNITED STATES PATENTS

| | | | |
|---|---|---|---|
| 2,929,977 | 3/1960 | Choudhury | 318/212 |
| 3,412,304 | 11/1968 | Baum et al. | 318/227 X |
| 3,514,682 | 5/1970 | Corey | 318/212 |
| 3,809,979 | 5/1974 | Zarth | 318/212 |

Primary Examiner—G. Z. Rubinson
Attorney, Agent, or Firm—Schroeder, Siegfried, Ryan & Vidas

[57] ABSTRACT

A dynamic motor brake circuit for alternating current induction motor in which the rotor for the motor is braked through the application of half-wave rectified AC power through a silicon controlled rectifier which is controllably energized to conduct over portions of the respective half cycles to vary the braking current to the stator field windings. The braking contactors and the rectifying means are controlled through a sequenced time control circuit means which limits and sequences the application of rectified power to the motor in accord with the adjustment of the time control means. The improved dynamic braking control includes means of coupling the stator windings to the control circuit to indicate a condition of application of AC power to the stator field windings for the purpose of conditioning the brake control circuit for operation.

13 Claims, 2 Drawing Figures

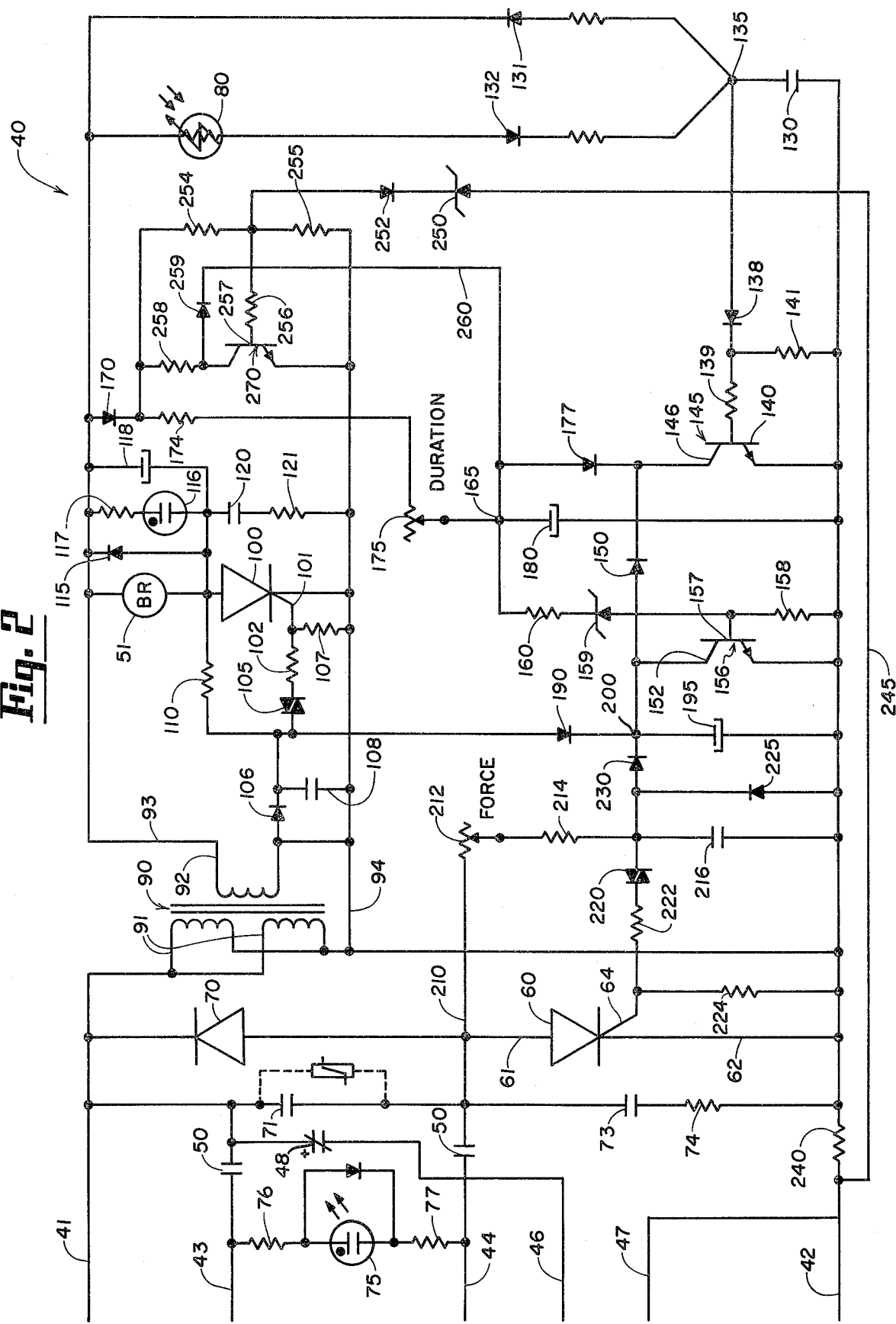

DYNAMIC MOTOR BRAKE CONTROL FOR AC MOTORS

My invention relates to a motor brake control system for alternating current induction motors and more particularly to an improved motor brake control circuit which secures quick braking or stopping of the motor immediately after its disconnection from the power supply and through the use of simplified and extensive solid state equipment.

Electrical braking or dynamic braking for slowing down and stopping electrical motors is well recognized in the prior art. It employs the principle of removing an alternating current voltage from the motor and applying an amplitude and time controlled DC voltage across the stator windings resulting in a static field across the stator which generates in the rotor of the motor a counterforce which cooperates with the static field to decelerate the rotor to a point of zero differential relative velocity with the static field, Dynamic braking is achieved by electrical means only and requires no mechanical modification to existing motors or equipment. Thus, it can be applied to any AC induction motor and is employed as a stop motion function and not as a holding brake. It may be employed in conjunction with electromechanical braking devices to extend the anticipated life of the same and reduce maintenance of the mechanical device by a significant amount. In the past, there have been several methods of dynamic braking including transformer, resistance and capacitance type brakes, all of which have had limited application because of the size, costs and heat producing effects of the same. Further, the previously used types including the capacitor types have been limited in their application and in their performance because of the inability to adjust the braking time and braking current of the switching devices in applying the generated direct current from the braking circuit resulting in arcing and wear on the switching contactors.

The present invention is directed to an improved solid state type dynamic brake for motor braking having a current limiting function and an accurately time control on the brake current application so that brake time for maximum rpm to zero rpm can be controlled to be proportional with the starting time and so that the power or energy expanded in the stop does not exceed the energy to start thereby minimizing the electrical strain on the motor field. In addition, the braking power or current is removed immediately upon bringing the motor to rest to avoid undue heating of the motor windings. In the present invention, an improved motor brake circuit is utilized which employs a solid state type rectifying device which is switched into circuit after disconnection of the AC power supply from the static field winding to generate a pulsating DC which is adjustable and to apply the DC only after the braking circuit has been made. The duration of the application of the adjustable DC will be accurately controlled so that the motor may be braked to a stop and the motor disconnected from the braking circuit as soon as the rotor is brought to rest. The improved circuit includes in addition a current limiting unit for maintaining the dynamic braking in the same range as the heat dissipation factor and the starting current of the motor to ensure that the braking device is not subject to over-current conditions to protect the same.

Therefore, it is the principal object of this invention to provide an improved dymanic motor braking system of the solid state type.

Another object of this invention is to provide a motor braking system in which the braking current and the time of application of the same are both adjustably controlled.

A still further object of this invention is to provide an improved motor brake circuit which is relatively low in cost, is easy to install and is less costly to maintain.

These and other objects of this invention will become apparent from a reading of the attached description together with the drawings wherein:

FIG. 2 is a schematic diagram of the improved dynamic motor brake and control.

Figure 1:
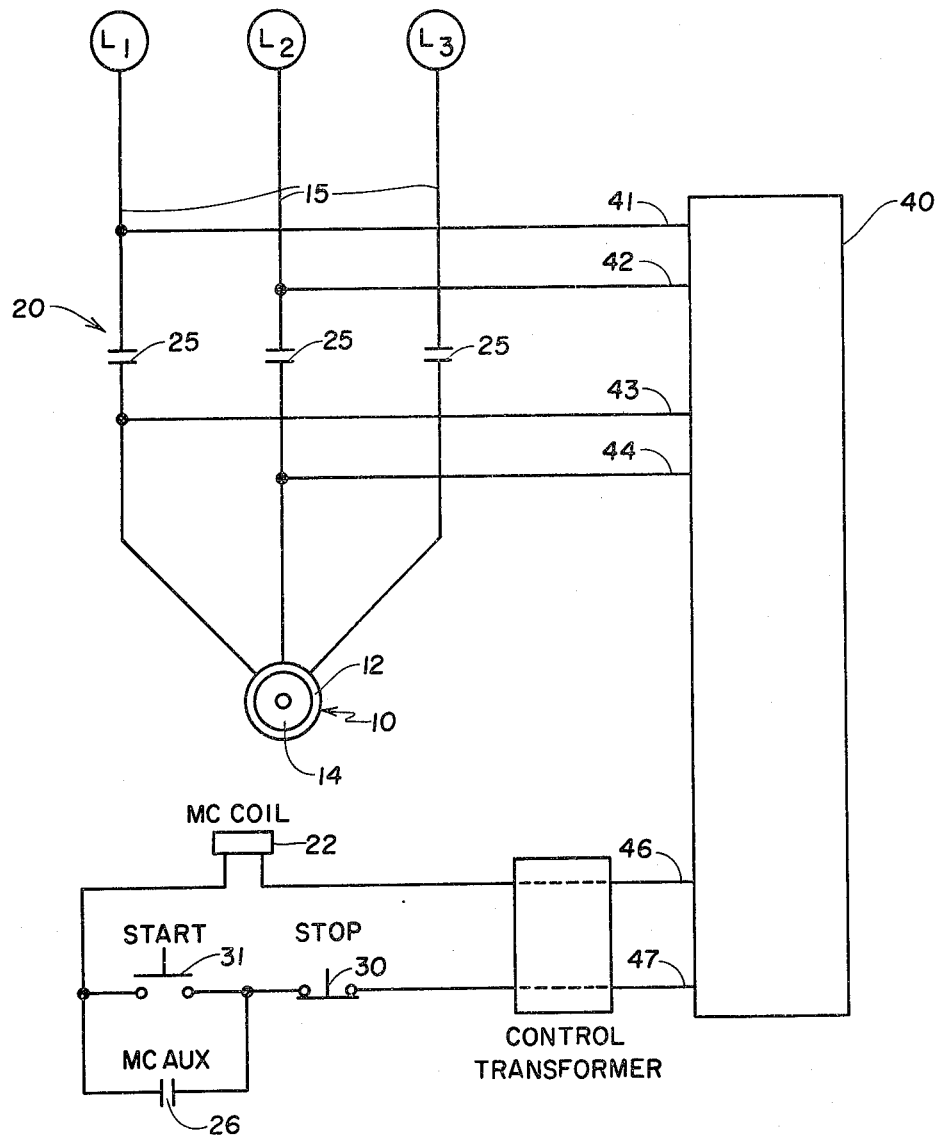
FIG. 1 is a schematic block diagram of the improved motor brake circuit installed on an energizing circuit for an electric motor showing the interconnection of the motor control with the improved dynamic braking motor circuit.

The improved motor brake system of the present invention is shown in block in FIG. 1 to indicate the application of the same to a polyphase alternating current motor. It will be understood, however, that it is equally applicable to single phase motors and may be utilized to any application of motors regardless of load with a minimum of installation changes or connections and without mechanical modification of the motor or load configuration. Thus, in FIG. 1, the motor is indicated generally at 10 and will preferably be an alternating current induction motor having a stator field 12 and a rotor 14 which is adopted to be connected to an alternating current supply as indicated by the conductors 15. The stopping and starting of the motor will be primarily controlled by a power starter or contactor indicated generally at 20 which includes an energizing coil 22 and power contacts 25 which couple the stator field 12 to the alternating current supply with the contacts being opened and closed with energization of the control coil 22. Such starters normally employ an auxiliary contact 26 for maintaining a holding circuit plus a stop-start button indicated at 30–31. Since most applications dictate the starters be operated at a low voltage control level on the control side, that is the stop-start button, a control transformer, such as indicated at 35, in block is employed for reducing line voltage to control voltage to control the energization of the coil 22 of the starter. Thus, in FIG. 1, the low voltage side will include an energization circuit of the control coil 22, the start 31 and stop 30 push buttons in series circuit with the secondary winding of the transformer. The auxiliary contact 26 is connected across the start button as a holding circuit in a conventional manner. As shown by the block 40 in FIG. 1, the dynamic motor brake is a separate and independent unit electrically connected to the motor contactor or starter in a manner indicated therein as the only modification required to existing motor control circuit. The block has two input terminals or conductors 41, 42, which connects to the supply conductors of the polyphase supply for the purpose of energizing the brake control. Two additional conductors or terminals 43, 44, are connected to the same two supply conductors beyond the contacts of the motor contacts 20 of the starter so that dynamic braking current or a rectified DC may be supplied directly to the one phase of the motor winding whenever the motor contacts are disconnected for the braking purposes. In addition, the starter control has conductors 46, 47, connected thereto in a manner to include the same in a series switching circuit with the primary side of the control transformer and conductors 41, 42 for the purpose of providing an electrical interlock through a normally closed contact 48 of a braking relay or contactor between the dynamic motor braking system and the starter as will be hereinafter identified.

In FIG. 2, the electrical components of the dynamic motor braking system 40 are shown in a schematic wiring diagram. The dynamic motor brake includes a braking contactor having braking contacts 50 and an energizing or operating coil 51 controlling the magnetic circuit opening and closing the contacts. The contacts 50 of the braking contactor are operative to connect the single phase current from the supply conductors 15 to a single phase of the stator winding for the purpose of applying a rectified AC to the same or a direct current which generates the static field for the purpose of slowing down and bringing the rotor 15 of the motor to a stop, Included in this circuit is a rectifying means in the form of a silicon controlled rectifier whose anode 61 is connected to one of the contacts and whose cathode 62 is connected to the line voltage terminal 42, with the circuit being completed through the stator field 12, and the other contact 50 of the braking contactor to the line voltage supply conductor 41. The rectifying means has a control grid 64 which when properly energized permits the silicon controlled rectifier to conduct current on alternate half cycles of the alternating current supply. By controlling the energization on the control gate, firing of the silicon controlled rectifier on the alternate half cycles may be proportioned for a portion of the half cycle to vary the amount of current conducted or rectified through the stator field winding. On the alternate half cycle, the rectifying means is nonconductive so that a pulsating DC component is applied to the stator field winding for braking purposes. Connected across the stator field winding during the period of time when the contacts or braking contacts 50 are closed is a diode 70 which is oppositely poled from the silicon controlled rectifier or SCR 60 and operates to absorb counter emf generated in the field winding as the static field is applied to the rotor and a current is generated in the shorted conductors therein. A metal oxide varistor capacitor 71 is connected in parallel with the diode 70 for diode protective purposes. Similarly, to protect the silicon controlled rectifier (SCR) 60 on alternate half cycles when it is conducting, a capacitor 73 and resistor 74 in series circuit are connected between the anode and cathode of the SCR to modify the current flow influenced by inductance generated in the stator field winding whenever the rectifying means is conducting on alternate half cycles. This will protect the controlled rectifying device. Also connected directly across the stator field windings or to the terminals 43, 44 is a light source in terms of a neon type bulb 75 which has in series circuit therewith protective resistors 76, 77. The bulb will be lighted whenever AC voltage is applied to the stator field winding under normal running conditions. This light source, as will be hereinafter noted, is photoelectrically couples to a photo cell 80 positioned in the control circuit for the purpose of indicating in the control circuit the application of AC power or rectified AC to the stator field winding.

The control circuit for the braking control is energized by a step down transformer 90 whose primary windings 91 are shown connected in parallel and across the conductors 41, 42 of the line voltage supply to provide for energization of the primary windings with an alternating current from a single phase alternating current source of power. The secondary winding 92 applies a reduced voltage to the control circuit at the conductors 93 and 94, the latter being tied to the conductor 42 as a reference. The braking contactor coil 51 is connected across the secondary winding 92 or the conductors 93, 94, and in series circuit with a silicon controlled rectifier 100 whose anode is connected to the one side of the coil 51 and whose cathode is connected to the conductor 94 with a control gate 101 being connected through a current limiting resistor 102 and a Diac 105 to the diode 106 and the secondary winding or conductor 94. A suitable bias resistor 107 is connected between the control gate and conductor 94 and a capacitor 108 is connected to the cathode side of the diode 106 and the reference conductor 94. A charging circuit is provided for the capacitor 108 through a resistor 110 connected to the anode of SCR 100 and one side of the coil 51. Thus, the capacitor 108 will be charged through the coil 51 and resistor 110 across the secondary winding to provide a voltage level or charge to be applied to one side of the Diac 105 which operates to apply a pulse voltage to the control gate through the current limiting resistor and bias resistors 102, 107 for the purpose of firing the same whenever the charge on the capacitor reaches a certain level. The diode 106 which is connected in parallel with capacitor 108 provides a positive charge only to capacitor 108. Protecting the SCR 100 is a diode 115 which is connected in parallel across the coil 51. An indicating light 116 having a resistor 117 in series therewith is also connected in parallel with the coil to indicate whenever the braking contactor is energized. In addition, a capacitor 118 is connected in parallel across the coil for filtering purposes to assure maintainance of coil 51. The silicon controlled rectifier 100 is protected on alternate half cycles when it is conducting by means of a capacitor 120 and resistor 121 in series circuit therewith and connected across the anode and cathode of the SCR 100 to modify the indductive affect of the energization of the coil 51.

The control circuit, in addition to the braking contactor contains a plurality of capacitor charging circuits which affect switching operations, as will be hereinafter described. The photo cell 80 is positioned in a capacitor charging circuit for a capacitor 130 which is connected at one side to conductor 42 or one side of the alternating current supply. The other side of the capacitor 130 is connected to a pair of opposing polarity charging circuits, the first of which includes the diode 131 which is connected at its opposite extremity on the conductor 93 on one side of the secondary winding 92. The second charging circuit includes an oppositely poled diode 132 to diode 131 which is connected in series circuit with the photo cell between the capacitor and the conductor 93. These charging circuits will detect the presence or absence of energization on the stator field winding and conditions the braking control circuit for operation in the manner to be hereinafter described. The photo cell 80 is at its low resistance value whenever light from the neon bulb 75 is coupled thereto indicating that the stator field of the motor is energized. At rest the bulb or light source 75 will be dark and the photo cell will be in the condition of high resistance. The charging circuits for the capacitor 130 will be effective on each half cycle of the AC supply applied to the secondary winding 92 across which the charging circuits and the condensor or capacitor are connected inasmuch as the conductor 94 is common to the conductor 42. Thus, on one-half cycle, the capacitor will be charged in one direction through the diode 131 at a certain voltage level while in the opposite half cycle of the AC supply, the capacitor will be charged on the opposite direction through the diode 132 and in accord with the current flow as controlled by the resistance of the photo diode 80. Thus, with energization of the stator field with the motor contactor closed, the photo cell optically coupled to the light source 75 will be at a low resistance value permitting a positive charging current to be applied across the capacitor 130 providing a high positive voltage charge at the junction of the charging circuits and the capacitor or the point indicated at 135. With resistance of the photo diode increased due to the absence of light, the decreased current flow through one charging path will provide a negative charge on the capacitor 130 leaving the control point 135 at a negative voltage level. This control point is coupled through diode 138 and a current limiting resistor 139 to a base 140 of a switching transistor 145 providing the first switching circuit or control circuit for the braking control. The voltage generated between the resistor 141 and the conductor 42 will provide a voltage bias on the base of the transistor 145. This will control the voltage level at the collector electrode 146 to provide a circuit therethrough with the emitter connected to the reference conductor 42. Thus, depending upon the polarity charge on the capacitor 130 and the resultant bias on the diode 138, the base 140 of the transistor 145 will be either at a high or low voltage signal to turn the same off or to permit conduction of the same. With the motor contactor open and the negative charge on the capacitor 130, the collector 146 is at a high potential level with the base at a low potential level so that the same will not be conducting. This will condition a timing circuit and provide for a second switching function and a second control circuit, as will be hereinafter identified.

As will be seen in FIG. 2, the collector 146 is connected through a diode 150 at a collector 152 of a transistor 156 whose emitter is connected to the reference conductor 42, and to the one side of the secondary winding 92, and with its base electrode 157 being connected to a voltage bias circuit in the form of a resistor 158 and the Zener diode 159 coupled through a series resistance 160 to a reference point 165 in a second charging circuit which controls the time delay during which the braking current is applied to the stator field. This time delay circuit is formed by a diode 170 coupled at one side of the secondary winding or conductor 93, a current limiting resistor 174 and an adjustable resistor 175 whose wiper is connected to the reference point 165 and to one side of a charging capacitor 180 whose opposite side is connected to the reference conductor 94 and 42. The resistor 175 adjust the charging current to the capacitor 180 which when it reaches a desired voltage level will permit current flow through the Zener diode 159 and provide a voltage signal on the base 157 of the transistor 156 for the purpose of switching the same. The collector 146 on the transistor 145 is connected through a diode 177 to the reference point 165 for the purpose of discharging the capacitor 180 whenever the transistor 145 conducts. The transistor 156 controls discharge paths for two additional capacitor charging circuits, one of which is formed by the diode 190 connected to one side of the capacitor 195 whose opposite side is connected to the reference conductor 94, 42 with the diode 190 leading to the charging circuit of capacitor 108 where it is connected to the midpoint between resistor 110 and the capacitor 108. The charge on the capacitor 195 will raise the voltage level at the control point, indicated at 200, to maintain the charge on the capacitor 108 and to permit the SCR 100 to continue firing maintaining energization of the braking relay coil 51. Whenever the transistor 156 conducts, the capacitors 195 and 108 will be discharged through the transistor to de-energize the braking relay.

The main power SCR 60 or rectifying means is also controllably energized through a charging circuit formed by conductor 210 which is connected through a variable or adjustable resistor 212 with its wiper being connected through a fixed resistor 214 and to one side of a capacitor 216 with the other side being connected to the reference conductor 94, 42. The charge on the capacitor 216 is coupled through a Diac 220 and a current limiting resistor 222 to the control gate 64 of the rectifying device 60 firing the same whenever the charge on the capacitor 216 reaches a predetermined level. The voltage bias resistor 224 is coupled between the control gate and the reference conductor 94 to develop the firing voltage for the SCR 60. Connected across the capacitor 216 is a diode 225 which permits the alternating half cycle of current from line conductor 42 to bypass the capacitor 216 in a circuit through the resistors 212, 214 and the motor stator winding back to the supply conductor 41. The control point or voltage point of the capacitor 216 common to the Diac 220 and the fixed resistor 214 is also coupled through a diode 230 to the control point 200 to be common to the collector 152 of the transistor 156 so that a discharge path will be provided for the capacitor 216 whenever the transistor 156 conducts. Thus, the transistor 156 when fired will control the discharge paths for the capacitors 108, 195, and 216 to maintain the same at zero charge.

The supply conductor 42 includes a small voltage dropping resistor 240 in series circuit therewith and coupling the same to reference conductor 94 on the low voltage side of the secondary winding providing the reference conductor for the circuit. The voltage drop generated across this resistor which is in series with the rectifying device 60 will provide an indication of current flow through the rectifier 60 and is utilized as an over-current reference source. A conductor 245 connected thereto is coupled through one side of the Zener diode 250 whose opposite side is connected to a diode 252 and to a voltage dividing network formed of resistors 254, 255, and a current limiting resistor 256. The resistor is coupled to a base 257 of a current protection transistor or a switching device 270. Its collector is coupled through a resistor 258 leading to one side of the diode 170 in the charging circuit for the capacitor 180 and with its emitter connected to the reference conductor 94. A diode 259 is connected between the collector and the resistor 258 and through a conductor 260 to the reference point 165 in the charging circuit for the capacitor 180. The transistor 270 is normally conductive so that an alternate charging circuit for the capacitor 180 is bypassed, the alternate charging circuit being formed of the diode 259 and conductor 260. However, under overcurrent conditions, the voltage generated across the resistor 240 will be at a level to overcome the Zener diode 250 providing for current flow in the voltage dividing network to change the bias on the base of the transistor 270 turning the same off and providing an alternate charging circuit from the diode 170, resistor 258, diode 259 and conductor 260 to the capacitor 180 for the purpose of rapidly charging the same. As will be hereinafter noted, this will quickly raise the voltage charge on the capacitor 180 to a point where it will control the firing of transistor 156 under overcurrent conditions eliminating the normal time delay provided by the primary charging circuit. The latter is formed by the diode 170, resistor 174, and variable resistor 175.

In operation, the improved dynamic motor brake circuit functions to apply a controlled DC component of current through the stator field winding 12 whenever the motor contactor 15 is disconnected after the motor has been running. Thus, in a rest condition with the starter de-energized and the start contacts or power contacts 25 open, no current flow or voltage is supplied to the stator field 12. Under such conditions, the connection of conductors 41, 42 to the line voltage supply above the power contactors will provide energization for the transformer 90 and a voltage applied from the secondary winding 92 across the control circuit. With the motor contacts 25 open and the braking contacts 50 open, and no current flow across the stator field winding, the neon light 75 will be de-energized and no light will eminate from the same. Under these conditions, the photo cell 80 in the control circuit and controlling the charging of capacitor 130 will be at a high resistance level so that in the direction of current flow through the diode 132, a smaller charging current will flow than through the alternate charging circuit formed by a diode 131 and the capacitor 130 will be at a negative charge. This will provide a reverse bias on the diode 138 and the base Q2 will be at low energy or signal level. Its collector will be at a high voltage point. During this condition, the charge on the capacitor will have built to a high level since the secondary winding will provide a charging path through the diode 170 and resistor 174, and adjustable resistor 175 to the capacitor 180. With the collector 146 of the transistor 145 at a high logic, and the base at a low logic or voltage level, the discharge path of the capacitor 180 will not be present. However, the Zener 159 will have fired placing a charge or voltage on the base 157 of the transistor 156 causing the transistor 156 to conduct and the capacitors 108, 195 and 216 to be at a discharge level. Under such conditions, the rectifying device 100 will not be energized and the power rectifier or silicon control rectifier 60 will not be conductive.

The motor is brought to a running condition by closing of the start button 31 providing an energizing circuit through the starter coil 22 which circuit will be maintained by the auxiliary contact 26 after the momentary start button is released. The main power contacts 25 will close applying power to the stator field 12 causing acceleration of the motor to a predetermined speed. Under these conditions of operation, the light 75 will receive energization and cause coupling to the photo diode 80 changing its resistance from a high resistance level to a low resistance level. With this change in one of the charging paths, the resultant charge on the capacitor 130 will shift from negative to positive applying a forward bias on the diode 138 causing the base 140 of transistor 145 to receive a higher voltage signal. This will provide for condition of the transistor 145 and a discharge path for the capacitor 180 through the diode 177 to the reference conductor. The change in the voltage level of the capacitor 180 will drop the voltage at the reference point 165 below the firing or conducting point of the Zener diode 159 and change the bias on the base 157 of the base 156. Its collector will be at a low voltage level and the charge on the condensors 195, 216, and 108 will remain at zero charge. The circuit, however, is now conditioned for application of the dynamic braking. Since the capacitor 108 is not charged, the rectifying device or control rectifier 100 will not permit the energization of the braking contact coil 51. Similarly, the rectifying device 60 will not be energized since it is isolated from the power supply by the open braking contacts 50. Whenever it is desired to stop the motor, the stop button 30 at the contactor or main control on the motor is pushed opening the control circuit or energizing circuit for the control coil 22 and opening the power contacts 25 of the starter 20. With the opening of the power contactors 25, line voltage is removed from the stator field 12 and the light 75 will darken raising the resistance of the photo diode 80 in the control circuit and changing the charge on the capacitor 130 to a negative charge. This will change the bias on the base 140 of the transistor 145 making it nonconductive. The discharge path of the charging circuit for the capacitor 180 now being broken, permits the normal charging operation of the capacitor 180 to resume through the charging circuit formed by diode 170, resistor 174 and adjustable resistor 175. This starts the timing of a time delay sequence during which rectified DC is applied to the stator field, as hereinafter described. During the charging of the capacitor 180, the voltage at the control point 165 is below the firing point of the Zener 159 and consequently, the base 157 of the transistor 156 is at a low voltage. This will open the discharge path through the transistor 156 permitting all of the capacitors 108, 195 and 216 to accept the charge. As the capacitor 195 accepts the charge, the voltage at the control point rises eliminating the discharge path for the capacitor 108 causing the same to charge through the resistor 110 and the coil 151. When a predetermined voltage is reached, the Diac 105 fires providing a voltage supply or signal on the control gate 101 of the silicon controlled rectifier 100 and energizing the relay coil 51. This will close the contacts 50 and open contact 48 of the braking contactor, and the power circuit through the AC supply conductor 41, the braking contacts 50, and the stator field will be completed through the rectifying device 60. Simultaneously, with the charging of the capacitor 108, the capacitor 216 charges through the resistors 212, 214, and when a predetermined level is reached, the Diac 220 becomes conductive triggering the silicon controlled rectifier 60 completing the power circuit on every other half cycle of the alternating current supply. On the opposite half cycles, the diode 70 and metal oxide varistor capacitor 71 absorb the high voltage due to the inductive reaction of the field winding 12, with the pulsating DC to protect the SCR 60. The rectifier 60 will conduct on a portion of each alternate half cycle in a pulsed operation and in accord with the charging rate of the charging circuit to supply the voltage charge on the capacitor 216 sufficient to trigger the Diac 220. By decreasing the resistance in this charging circuit through adjustment of the wiper of the adjustable resistor 212, the charging time is shortened to provide for a greater amount of power applied for dynamic braking in the stator field. By increasing the charging time of the capacitor 216 and causing the Diac to fire at a later portion on the half cycle of the alternating voltage wave to shorten the time of condution of the rectifier 60 for the alternate half cycles of the alternating power supply to provide the pulsating DC to the stator field. Thus the braking force in terms of the amount of rectified DC applied to the stator field is adjusted by the adjustable resistor 212 and by increasing the current flow, the motor will be braked from a run to a stop condition in a shorter period of time.

As the capacitor 180 reaches a full charge under these conditions, the setting of the Zener 159 is exceeded changing to bias on the base 157 of the transistor 156 causing the same to become conductive. This will provide a discharge path for the capacitors 216 and 108 and 195 turning off the rectifying device 60 and opening the braking contacts 50. The rectifying device will be de-energized prior to the opening of the braking contacts 50 so that no current flow will exist as the braking contacts separate to improve the life of the same. The time duration during which the braking current is applied to the stator field 12 with the starter contactor 20 open will be controlled by the setting of the adjustable resistor 175. By reducing the resistance in this circuit, the charging rate is increased shortening the time in which the secondary switching of the transistor 156 takes place and hence the application of DC power to the stator field. This time will be increased by increasing the resistance and reducing the charging current to the capacitor 180. In the setup of the braking control, the time duration is adjusted so that the braking contacts will open as soon as the motor normally comes to a stop with the rectified current flow level as adjusted by the resistor 212. Under normal conditions, I have found that the stopping time should be four times the acceleration time for a conventional motor to remain within the safe operating characteristics of the same and without causing undue over-heating stresses.

In the event that the current flow through the rectifying device 60 exceeds a predetermined or adjusted level, the voltage drop across the resistor 240 will provide a voltage across the Zener diode 250 causing the transistor 270 to go from a conducting condition to a nonconducting condition. Current flow in the voltage dividing network 254, 255 and 256 will alter the bias on the base of the transistor 270 to cause the same to become nonconductive. This will provide for a alternate energization circuit for the capacitor 180 through the diode 259 and conductor 260 which would normally be bypassed by the conduction of the transistor 270. Thus, the charging rate on the capacitor 180 will increase significantly causing a shutdown of the braking circuit in the event that current flow through the rectifying device and in the power circuit exceeds a desired level. Under normal conditions, however, the transistor 270 will remain conductive and the alternate bypass charging circuit for the capacitor 180 will be removed so that the normal charging rate will be controlled by the resistors 174, 75.

The improved dynamic motor braking control will be applicable to all types of motor applications regardless of load attached to the same. In the installation, the additional electrical circuitry as set forth in FIG. 1 will be added to the normal run stop starter contactor circuit to provide for the coupling of the electrical connection of the braking control thereto. This does not require any mechanical change in the motor configuration. While the braking control will bring the motor to rest, a mechanical brake may be utilized to maintain the motor at rest if requirements for the same so dictate. The braking force is adjusted by the control voltage on the silicon controlled rectifier 60 to utilize the portions of alternate half cycles of the alternating current flow and converts the same to a pulsating DC to a static field in the stator field winding of the motor. The magnitude of this current will be adjusted in accord with the acceleration time of the motor and the timing of the control circuit in maintaining the braking contact 50 energized after de-energization of the starter contactor 20 will be adjusted by the time delay circuit in which the adjustable resistor 175 is controlling. This will normally be four times the length of acceleration time. The improved circuit includes an overload protective device which bypasses the time delay circuit in the event of overcurrent conditions.

In considering this invention, it should be remembered that the present disclosure is illustrative only and the scope of the invention should be determined by the appended claims.

What is claimed is:

1. A control circuit for an alternating current motor having a stator winding adapted to be connected to an AC source of power for energizing the same and a power contactor for selectively connecting the stator winding to the AC source of power to operate the same comprising, a dynamic braking circuit for braking said motor from a running condition to a stop condition with disconnection by the power contactor of the AC source of power from the stator winding, said dynamic braking circuit including a variably operated rectifying means, a braking contactor including contact means for connecting the AC source of power through the rectifying means to the stator winding to apply rectified AC current to the stator winding to brake the motor, a first control circuit inlcuding a switching means having two conditions of operation, a second control circuit connecting to the first control circuit to be controlled thereby in one condition of its operation and including a switching means having two conditions of operation, said second control circuit in one condition of operation being operative to energize the braking contactor and operate the rectifying means, aand means selectively responsive to the energization of the stator winding for controlling the first control circuit means between the two conditions of switching operation, said means responsive to the connection of the stator winding to the source of power being an optical coupling.

2. The control circuit of claim 1 in which the first control circuit means includes a capacitor and a variable charging circuit controlling the operation of the first switching means and in which the optical coupling controls the variable charging circuit in accord with the energization of the stator winding to effect switching of the first switching means.

3. The control circuit of claim 2 in which the rectifying means is a silicon controlled rectifier having a control gate and in which the switching means of the second control circuit controls a voltage level signal applied to the control gate for controlling the firing of the rectifying means.

4. The control circuit of claim 3 and including time delay means coupled to the switching means of the second control circuit and operative in cooperation with the switching means of the first control circuit to delay the operation of the second control circuit switching means.

5. The control circuit of claim 4 in which the time delay means includes a charging control circuit including a capacitor and an adjustable resistor which overrides the effect of the first named switching means after a predetermined time delay to permit operation of the second control circuit in the de-energization of the braking contactor and the rectifying means.

6. A control circuit for alternating current motor having a stator winding adapted to be connected to an AC source of power for energizing the same and a power contactor for selectively connecting the stator winding to the AC source of power to operate the same comprising, dynamic braking circuit for braking said motor for a running condition to a stop condition with disconnection by the power contactor for the AC source of power from the stator winding, said dynamic braking circuit including a variably operated rectifying means, a braking contactor including contact means for connecting the AC source of power through the rectifying means to the stator winding to apply rectified AC current to the stator winding to brake the motor, a first control circuit including a switching means having two conditions of operation, a second control circuit connecting to the first control circuit to be controlled thereby in one condition of its operation and including a switching means having two conditions of operation, said second control circuit in one condition of operation being operative to energize the braking contactor and operate the rectifying means, said rectifying means being a silicon controlled rectifier having a control gate with the switching means of the second control circuit controlling the voltage level signal applied to the control gate for controllably firing the rectifying means, and means selectively responsive the energization of the stator winding for controlling the first control circuit means between the two conditions of switching operation, said silicon controlled rectifier with its control gate being controllably energized through a capacitor charging circuit including a second variable resistor which charging circuit is energized only when the power applied to the stator winding and the braking contactor is energized.

7. The control circuit of claim 6 in which the charging circuit with its adjustable resistance varies the operating point of the silicon control rectifier at varying points along the alternating input current from the AC power supply applied to the rectifying means.

8. The control circuit of claim 7 and including current limiting circuit means responsive to a predetermined current flow in the rectifying means for shorting out the capacitance charging circuit of the time delay means and affecting the shortened switching operation of the second control means on the presence of an overload on the rectifying means.

9. A control circuit for an alternating current motor having a stator winding adapted to be connected to an AC source of power for energizing the same and a power contactor for selectively connecting the stator winding to the AC source of power to operate the same comprising, a dynamic braking circuit for braking said motor from a running condition to a stop condition with disconnection by the power contactor of the AC source of power from the stator winding, said dynamic braking circuit including a variably operated rectifying means, a braking contactor including contact means for connecting the AC source of power through the rectifying means to the stator winding to apply rectified AC current to the stator winding to brake the motor, a first control circuit including an optical coupling connected in part to the stator winding and selectively responsive to the energization of the stator winding for conditioning the dynamic braking circuit for the application of rectified AC to the stator winding, a second control circuit including a first means for energizing the braking contactor and a second means for rendering the rectifying means operative after energization of the braking contactor, time delay circuit means coupled to the second control circuit and operative to the control of the second control circuit to a condition where the braking contactor and rectifying means are de-energized, said first control circuit being connected to the timed delay circuit means and operative to initiate the timed delay circuit means in the control of the second control circuit whenever the stator field is de-energized.

10. The control circuit of claim 9 and including current limiting means responsive to a predetermined flow through the rectifying means for overriding the time delay means independent of the operation of the first control circuit.

11. The control circuit of claim 9 in which the time delay means is adjustable to vary the time in which rectified AC power is applied to the stator windings.

12. The control circuit of claim 9 in which the rectifying means includes means of adjusting the amount of rectified AC current flowing into the stator windings during braking.

13. The control circuit of claim 9 including means in the time delay circuit for adjusting the time delay in which rectified AC is applied to the stator field windings and further adjustable means for varying the amount of rectified AC current applied to the stator field for braking purposes with the further means for insuring that the rectifying means is rendered inoperative prior to the opening of the braking contacts.

* * * * *